US008880198B2

(12) United States Patent
Goose et al.

(10) Patent No.: US 8,880,198 B2
(45) Date of Patent: Nov. 4, 2014

(54) BYZANTINE FAULT-TOLERANT SCADA SYSTEM

(75) Inventors: Stuart Goose, Berkeley, CA (US); Jonathan Kirsch, Menlo Park, CA (US)

(73) Assignee: Siemens Aktiengesellschaft, Munich (DE)

(*) Notice: Subject to any disclaimer, the term of this patent is extended or adjusted under 35 U.S.C. 154(b) by 44 days.

(21) Appl. No.: 13/488,977

(22) Filed: Jun. 5, 2012

(65) Prior Publication Data

US 2013/0053986 A1 Feb. 28, 2013

Related U.S. Application Data

(60) Provisional application No. 61/526,371, filed on Aug. 23, 2011.

(51) Int. Cl.
*G06F 15/16* (2006.01)
*G05B 19/042* (2006.01)
*G05B 9/03* (2006.01)
*G05B 19/418* (2006.01)

(52) U.S. Cl.
CPC .. *G05B 19/4183* (2013.01); *G05B 2219/32406* (2013.01); *G05B 2219/32404* (2013.01)
USPC ................... 700/9; 700/18; 700/82; 709/250; 714/12; 717/151; 707/661

(58) Field of Classification Search
USPC ...................... 700/9, 17, 18, 79, 82; 709/250; 707/661; 717/151
See application file for complete search history.

(56) References Cited

U.S. PATENT DOCUMENTS

| | | | | |
|---|---|---|---|---|
| 6,356,795 | B1* | 3/2002 | Barthel et al. | 700/82 |
| 2009/0216910 | A1* | 8/2009 | Duchesneau | 709/250 |
| 2009/0313614 | A1* | 12/2009 | Andrade et al. | 717/151 |
| 2010/0250497 | A1* | 9/2010 | Redlich et al. | 707/661 |

* cited by examiner

*Primary Examiner* — Kavita Padmanabhan
*Assistant Examiner* — Douglas Lee

(57) ABSTRACT

A system for automatically monitoring and controlling an infrastructure or process includes a plurality of remote clients installed along various portions of an industrial infrastructure or an infrastructure performing a process. Each of the remote clients collects data. A plurality of server replicas is in communication with the plurality of remote clients. The server replicas receive the collected data from the remote clients and process the received data. The plurality of remote clients and the plurality of server replicas communicate across an electronic network. The plurality of server replicas includes a state machine replication system that is tolerant of a failure of one or more of the server replicas.

25 Claims, 5 Drawing Sheets

BYZANTINE FAULT-TOLERANT SCADA SYSTEM

CROSS-REFERENCE TO RELATED APPLICATION

The present application is based on provisional application Ser. No. 61/526,371, filed Aug. 23, 2011, the entire contents of which are herein incorporated by reference.

TECHNICAL FIELD

The present disclosure relates to Supervisory Control and Data Acquisition (SCADA) and, more specifically, to systems for Byzantine fault-tolerant SCADA systems.

DISCUSSION OF THE RELATED ART

Supervisory control and data acquisition (SCADA) systems are automated approaches for the control of industrial machinery and processes. For example, SCADA systems may be used to provide automated control of power generation facilities, waste treatment centers, or manufacturing plants. Additionally, SCADA systems are widely used for other critical infrastructure systems, such as for electricity transmission and distribution.

FIG. 1 is a schematic diagram illustrating the basic components of a SCADA system. The system may include a SCADA server 11. The SCADA server may maintain real-time communication with one or more remote terminal units (RTUs) 14. The RTUs 14 may alternatively be programmable logic controllers (PLCs), for example, in the context of industrial automation, or may be more generally referred to as remote clients. However, for the purposes of simplicity of explanation, RTUs are illustrated as an example of a suitable set of remote clients.

As each RTU 14 may communicate with and aggregate data from one or more local sensors installed within the system being controlled at respective local elements that are involved with implementing an industrial process or critical service 15, the SCADA server 11 may periodically poll the RTUs 14 to gather and process the sensor data. The SCADA server 11 may also use the gathered sensor data to make decisions as to the control of the system and may also issue supervisory control commands to the RTUs 14 for the control of their respective local elements. The RTUs 14 may also be configured to send messages to the SCADA server 11 without the SCADA server 11 first initiating the communication. For example, the RTUs 14 may send updated sensor data without first being polled by the SCADA server 11.

The SCADA server 11 may be accessed and programmed by a user using a human machine interface (HMI) workstation 12. The HMI workstation 12 may periodically query the SCADA server 11 to graphically display the state of each of the RTUs 14 for the user. The SCADA server 11 may also push information to the HMI workstation 12 without the HMI workstation 12 first requesting the information.

The SCADA server 11 may communicate with the RTUs 14 across a computer network 13 such as a local area network (LAN), where the system being controlled is localized, or a wide area network (WAN), where the system being controlled is distributed.

The SCADA server 11 is implemented as one or more computer systems executing one or more applications that work together to provide monitoring and control functionality.

SUMMARY

A system for automatically monitoring and controlling an infrastructure or process includes a plurality of remote clients installed along various portions of an industrial infrastructure or an infrastructure performing a process. Each of the remote clients collects data. A plurality of server replicas is in communication with the plurality of remote clients. The server replicas receive the collected data from the remote clients and processes the received data. The plurality of remote clients and the plurality of server replicas communicate across an electronic network. The plurality of server replicas includes a state machine replication system that is tolerant of a failure of one or more of the server replicas.

The plurality of remote clients may include a plurality of Remote Terminal Units (RTUs) or a plurality of Programmable Logic Controllers (PLCs). The plurality of server replicas may include a plurality of Supervisory Control and Data Acquisition (SCADA) replica servers. The state machine replication system may be tolerant of up to a predetermined number of Byzantine failures of the server replicas.

Each of the plurality of server replicas may be configured to dynamically agree on an expiration of a plurality of logical timeouts. The agreement on the expiration of the plurality of timeouts may include exchanging a constant number of messages for any number of logical timeouts, within the plurality of timeouts, greater than or equal to one. The size of the messages does not depend upon the number of logical timeouts.

Each of the plurality of server replicas may be configured to send messages to one of the remote clients of the plurality of remote clients using a first protocol and may be configured to receive messages from one of the remote clients of the plurality of remote clients using a second protocol that is different from the first protocol. The first protocol may be a unidirectional logical channel for reliably sending a message from multiple sources to a single destination and for acknowledging, to one or more of the multiple sources, that the message has been successfully received. The first protocol may be implemented via a selective repeat sliding window protocol with cumulative acknowledgments and negative acknowledgements where a server replica of the plurality of server replicas sends data messages to a client and the client sends data acknowledgments and negative acknowledgements. The single destination's acknowledgements of the receipt of the messages from the replica servers may be processed by the replica servers without first ordering them.

The first protocol may provide for a server replica to vote to close a connection between the server replicas and a client as a local decision and the connection may be closed when a predetermined number of replicas vote to close the connection.

The second protocol may be a unidirectional logical channel in which cumulative acknowledgements are used to advance a sliding window to a particular value when the cumulative acknowledgments acknowledging at least up to the particular value are received from a sufficient number of server replicas.

A method for automatically monitoring and controlling an infrastructure or process includes collecting data pertaining to a function of an infrastructure or process at one or more clients. The collected data is received at each of a plurality of server replicas. The plurality of server replicas includes a fault-tolerant state machine replication system. The received data is used to monitor or control the infrastructure or process.

The one or more clients may include a plurality of Remote Terminal Units (RTUs) or a plurality of Programmable Logic Controllers (PLCs). The plurality of server replicas may include a plurality of Supervisory Control and Data Acquisition (SCADA) replica servers.

The fault-tolerant state machine replication system may be a Byzantine fault-tolerant state machine replication system.

Each of the plurality of server replicas may dynamically agree on an expiration of a plurality of logical timeouts.

One or more of the plurality of server replicas may send messages to one of the one or more clients using a first protocol and may receive messages from one of the one or more clients using a second protocol that is different from the first protocol.

The first protocol may be a unidirectional logical channel for reliably sending a message from multiple sources to a single destination and for acknowledging, to one or more of the multiple sources, that the message has been successfully received.

The second protocol may be a unidirectional logical channel in which cumulative acknowledgements are used to advance a sliding window to a particular value when the cumulative acknowledgments acknowledging at least up to the particular value are received from a sufficient number of server replicas.

A state machine replication system includes a plurality of server replicas. At least one remote client is in communication with the plurality of server replicas. The plurality of replicas and the remote client communicate across an electronic network. The plurality of server replicas includes a state machine replication system that is tolerant of a failure of one or more of the server replicas. The plurality of replicas is configured to dynamically agree on an expiration of a plurality of logical timeouts.

The agreement on the expiration of the plurality of timeouts may include exchanging a constant number of messages for any number of logical timeouts, within the plurality of timeouts, greater than or equal to one. The size of the messages does not depend upon the number of logical timeouts.

A state machine replication system includes a plurality of server replicas. At least one remote client is in communication with the plurality of server replicas. The plurality of replicas and the remote client communicate across an electronic network. The plurality of server replicas includes a state machine replication system that is tolerant of a failure of one or more of the server replicas. Each of the plurality of server replicas is configured to send messages to the remote client using a first protocol and is configured to receive messages the remote client using a second protocol that is different from the first protocol. The first protocol is a unidirectional logical channel for sending a message from multiple sources to a single destination and for acknowledging, to each of the multiple sources, that the message has been successfully received.

The second protocol may be a unidirectional logical channel in which cumulative acknowledgements are used to advance a sliding window to a particular value when the cumulative acknowledgments acknowledge at least up to the particular value are received from a sufficient number of server replicas.

Each of the plurality of server replicas may be configured to advance a corresponding local window upon receiving a data packet with a sequence number higher than an end of the local window.

Each of the plurality of server replicas may be configured to detect when one or more of the at least one remote clients is experiencing a Byzantine failure when the server replica receives a data packet with sequence number greater than a last sequence number collectively acknowledged by the plurality of replica servers by a value at least equal to a window size of the server replica.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
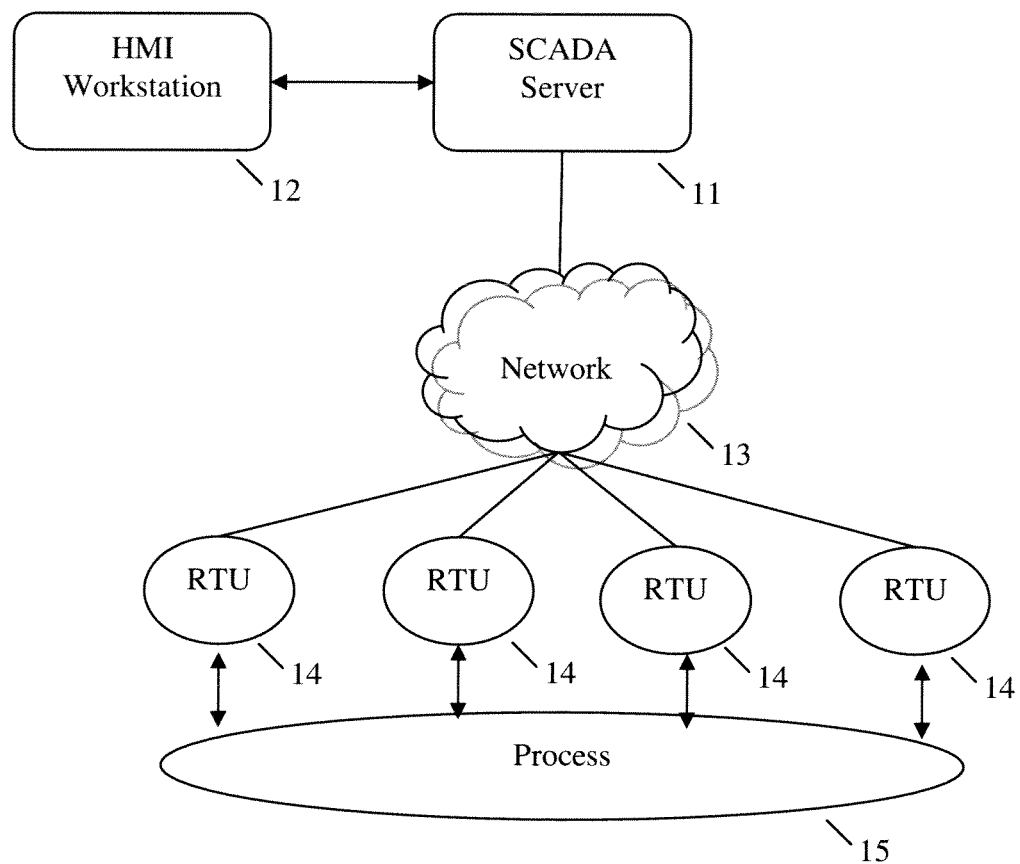
FIG. 1 is a schematic diagram illustrating the basic components of a SCADA system.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

As described above, the SCADA server may be embodied as one or more computer systems executing one or more applications that work together to provide monitoring and control functionality. However, the SCADA server may be vulnerable to malfunction or malicious attacks as the one or more applications that comprise the server each tend to exclusively provide key functionality. Accordingly, a failure of the SCADA server, caused either by malfunction or malicious attack, may result in the halting of the industrial process or critical service under control, or the sending of invalid instructions to the RTUs that can be potentially dangerous and/or destructive.

One approach for hardening computer systems against failure is known as state machine replication. State machine replication refers to a technique by which the function of a computer system is replicated across multiple computer systems that communicate with each other to ensure synchronization of state so that in the event of a partial failure, by which one or more of the replicated computer systems ("replicas") fail, the surviving replicas may continue to provide functionality.

State machine replication differs from the use of a hot standby in which a second copy of the SCADA Server receives and processes incoming messages as the "primary" SCADA Server does, but the outgoing messages of the hot standby are suppressed (i.e., not actually sent to the destination). The primary and the hot standby run a "heartbeat" protocol between them, with the hot standby assuming the role of the primary if it thinks that the primary has failed.

In the hot standby approach, the system does not guarantee that the primary and the hot standby process incoming message events or timeout events in the same order. Thus, there is a chance that their state could diverge, causing inconsistency should the hot standby assume control. This is in contrast to state machine replication, where the state machine replication protocol enforces a strict order on all events that might cause a state transition.

Additionally, the state machine replicas may all be active, i.e., their outgoing messages are not suppressed, but rather are able to mask out faulty values at the destination.

Moreover, using a Byzantine fault-tolerant state machine replication protocol allows the system to survive partial compromises, which is not possible using the hot standby approach, since a faulty primary could take malicious actions but, by sending certain messages, make the hot standby think the primary is operating correctly, and thus the hot standby would never assume control.

Additionally, the amount of fault tolerance is restricted in the hot standby approach since there is at most one hot standby; in contrast, a state machine replication protocol may be configured to tolerate any number of faults.

State machine replication may be said to be Byzantine fault-tolerant when the replicated system is capable of continuing to function even in the event that one or more of the replicas not only fail, but produce spurious output that may otherwise be confusing and disruptive to the state machine replication system.

Byzantine fault-tolerant state machine replication is an effective technique for building highly available systems that can withstand partial compromise. However, traditional state machine architecture such as existing Byzantine fault-tolerant state machine replication may not be readily applicable to SCADA applications used in many control systems. This is because SCADA systems generally require the SCADA server to take action based on the passage of time, such as when the SCADA server decides that it is time to poll an RTU. Absent perfectly synchronized clocks, the passage of time might not be observed consistently at each replica. Moreover, depending upon synchronized clocks may introduce reliability concerns as clocks may be subject to clock skew by which different clocks run at different rates. Additionally, large SCADA systems may contain thousands of field devices and thus thousands of RTUs, each of which may be polled individually. The number of messages required to coordinate any time-based events, such as timeout of expected responses, may grow proportionally to the number of time-based events. Where a great many RTUs are involved, and thus a great many time-based events need to be coordinated, the number of messages required becomes costly.

Moreover, traditional state machine replication systems are designed for reliable client-driven communication between client and server, for example, where the replicated server merely responds to client-initiated requests and does not itself initiate interaction. SCADA systems, however, rely upon communication both from the clients, for example, the RTUs, to the SCADA server as well as from the SCADA server to the clients.

Accordingly, traditional approaches for state machine replication such as Byzantine fault-tolerant state machine replication may not be directly applicable to SCADA systems.

Exemplary embodiments of the present invention relate to the system and use of replicated state machines for SCADA systems in which the replicas are able to agree upon a logical point in time at which time-based actions should be taken, for example, a "logical timeout," and in which reliable communication is assured for both client- and server-initiated communication.

Figure 2:
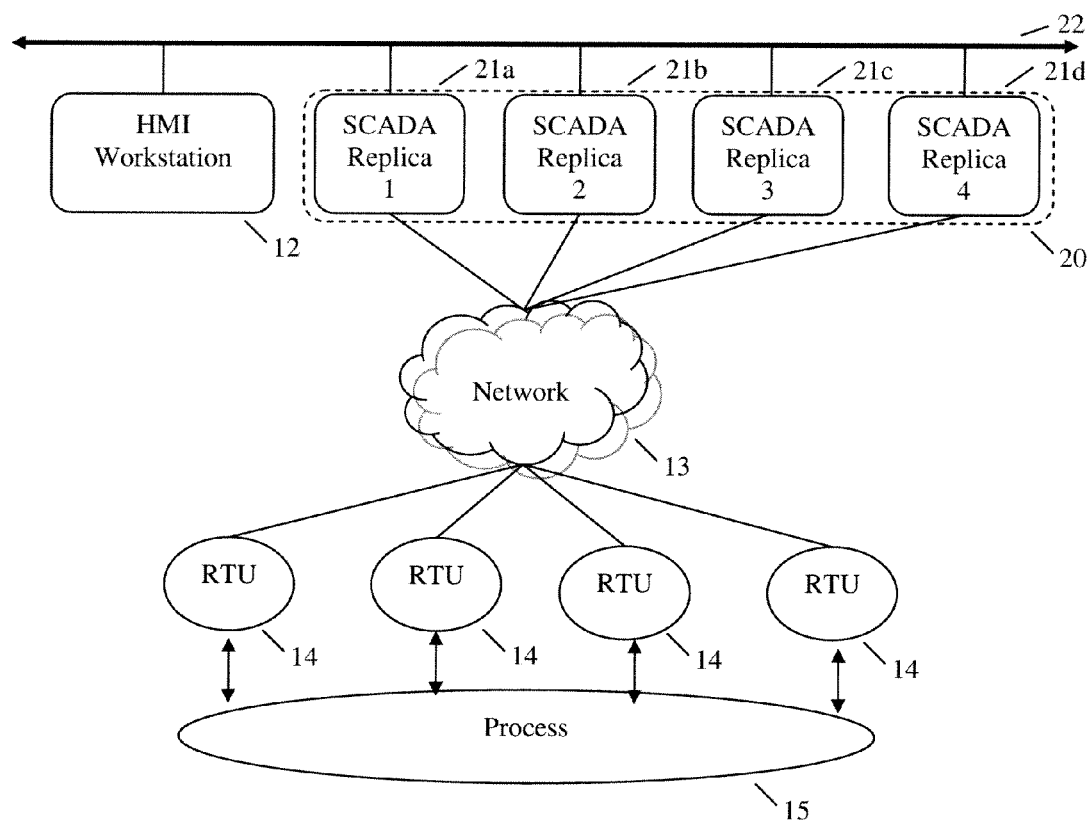
FIG. 2 is a schematic diagram illustrating a replicated SCADA system according to exemplary embodiments of the present invention.

FIG. 2 is a schematic diagram illustrating a replicated SCADA system according to exemplary embodiments of the present invention. Rather than using a single SCADA server 11 as seen in FIG. 1, exemplary embodiments of the present invention may utilize a set of SCADA server replicas 20 that may include, for example, a first replica 21a, a second replica 21b, a third replica 21c, and a fourth replica 21d. Each of the replicas 21a-d may be connected to each other and to one or more HMI workstations 12 along a computer network 22. The computer network 22 may be a LAN, a WAN, or the Internet and may be the same as the network 13 that connects the RTUs 14. While only four replicas 21a-d are shown, exemplary embodiments of the present invention are not limited to this number. The only constraint on the number of replicas used may be that imposed by the type of replication system being employed. For example, a Byzantine fault-tolerant state machine replication system may require the use of 3f+1 replicas, where f is the number of compromised replicas that may be tolerated.

A SCADA Server may take action based on the passage of time, such as when a polling period expires and the SCADA Server decides to send a poll message to one or more RTUs. Therefore the SCADA Server makes a state transition that is not deterministic, because the state transition may be made at different logical times at different replicas. Replicated state-machines generally require deterministic state transitions, so this time-based action may represent a challenge in applying replicated state-machines to the context of SCADA Servers. For example, if each SCADA Server replica were to make a state transition based on the passage of time on its local clock, the replicas could become inconsistent with one another. Thus, the SCADA Server replicas according to exemplary embodiments of the present invention may be made to agree on the logical point in time when time-triggered state transitions should be made with respect to other state transitions, for example, the replicas may be made to agree on the logical point in time at which each polling period expires. Moreover, since the system may contain thousands of RTUs and the SCADA Server may need to set a polling timeout for each one, the mechanism for agreeing on the expiration of a logical timeout may scale with the number of timeouts being set.

While some communication between the SCADA Server replicas may be client driven, for example, request/reply protocol between an HMI workstation and the SCADA Server replicas, communication between the SCADA Server replicas and the RTUs may be primarily server driven. For example, the replicas may send a message (e.g., a poll message) to the RTUs without having previously executed an RTU message triggering the replicas' message to be sent.

Given that many SCADA systems require reliable communication between the SCADA Server and the RTUs (communication in which successful delivery of messages is guaranteed), exemplary embodiments of the present invention may utilize a different, more flexible reliability mechanism to ensure the reliability of messages both from SCADA Server replicas to the RTUs and from the RTUs to the SCADA Server replicas.

The execution of an event by the SCADA Server replicas may cause the replicas to send a message to a set of one or more clients. If the event was a message event, the set of clients may or may not include the client that submitted the executed message.

Exemplary embodiments of the present invention may utilize the following set of approaches to implement a replicated server-driven SCADA system:

1. A scalable method for allowing a set of server replicas, some of which may be Byzantine, to agree on the expiration of a logical timeout.

2. A method for efficient, reliable, and FIFO communication from a client to a set of server replicas, where either the client or some of the server replicas may be Byzantine.

3. A method for efficient, reliable, and FIFO communication from a set of server replicas to one or more clients, where either the client or some of the server replicas may be Byzantine.

It should be noted, however, that communications from client to server replicas or from server replicas to a client need not be performed on a FIFO basis; however, exemplary embodiments of the present invention may provide this capability, where desired.

Exemplary embodiments of the present invention may utilize a protocol for enabling a set of server replicas to agree on the expiration of a logical timeout. In order to implement the agreement, rather than requiring a number of messages be communicated that is proportional to the number of logical timeouts set by the server application, exemplary embodiments of the present invention may require a constant number of messages to be exchanged, independent of the number of logical timeouts set by the server application. This constant may be tunable and may be related to the desired timeout granularity. By using a constant number of messages, this protocol may scale well with the number of application timeouts set, which is highly useful for large-scale SCADA systems.

Protocols may be used for efficient, reliable, and FIFO communication between two correct endpoints such as between the SCADA server replicas. Such protocols may use a sliding window mechanism, whereby each packet is assigned a sequence number, and the sender sends a bounded number of packets to the receiver and can only send a new packet when the first unacknowledged packet has been acknowledged. Sliding window protocols may use cumulative acknowledgements, whereby the receiver can pass a single number, n, to the sender to acknowledge the reception of all packets up with sequence numbers up to and including n; this number may be referred to herein as an "all-received-up-to," or "ARU" value. In addition, protocols may use negative acknowledgements, where the receiver can pass a list of missed sequence numbers to the sender when it learns that it has missed one or more packets. This may be used to minimize unnecessary retransmissions. A protocol that uses a sliding window, cumulative acknowledgements, and negative acknowledgements may be referred to herein as a selective repeat protocol.

Implementing a sliding window protocol in the context of the Byzantine fault-tolerant, SCADA-based architecture described above poses several challenges compared to implementing a typical one-to-one communication channel. For example, the endpoints of the communication are asymmetrical. One endpoint is a single client process, while the other endpoint is a replicated server process. While the server is a single logical entity, it may be implemented by several physical replicas, which are responsible for actually passing messages to the client process.

Additionally, the client and/or up to f replicas may be faulty. A complete solution not only guarantees the correct operation of the logical channel (i.e., reliable and FIFO communication) despite the behavior of the faulty processes, but it also prevents the faulty processes from excessively consuming the resources (i.e., bandwidth and CPU cycles) of the correct processes.

Additionally, the server replicas may need to communicate with thousands of clients and accordingly, exemplary embodiments of the present invention may provide a solution that scales as the number of clients increases.

In a Byzantine fault-tolerant state machine replication system, up to f of the replicas (some of which may be correct) may fall behind in the execution of events. This occurs when (2f+1) replicas execute more quickly than the other f. This problem occurs because the slow replicas may not be able to be distinguished from faulty replicas. A complete solution may work correctly despite this property.

In client-driven Byzantine fault-tolerant state machine replication systems, each client may have only one outstanding request at a time. For example, the client waits until it receives a reply for message i before it sends message (i+1). In addition, as noted above, all retransmissions may be driven by the client. Alternatively, server replicas may push a message to a client. Here a server replica may be allowed to unilaterally garbage collect the state associated with the channel at any time, and accordingly, there may be no guarantee that a particular message will be received by the client, even if the client and all server replicas are correct.

Exemplary embodiments of the present invention provide new logical connection protocols. Each logical connection is a unidirectional channel. Accordingly, data messages only flow across each channel in one direction for each logical channel. However, control messages, unlike data messages, may still flow across the channel in both directions. The first logical connection protocol may provide a reliable, FIFO channel from a client to a set of server replicas. This connection may be referred to herein as a Client-to-Servers, or CS, connection. The second logical connection protocol may provide a reliable, FIFO channel from the server replicas to a client. This connection may be referred to herein as a Servers-to-Client, or SC, connection. The server replicas open up one SC connection to each client with which they wish to communicate. Each logical connection protocol is implemented by two sub-protocols, one run by the client and one run by the server replicas. By providing a pair of unidirectional channels, rather than one bidirectional channel, each one may be optimized for performance in light of the fact that the endpoints are asymmetrical, as described above.

CS connection protocols may implement a logical channel from a potentially faulty client to a set of potentially faulty server replicas, rather than just from one correct process to another. Clients may have a predetermined number of outstanding, unacknowledged messages equal to the sliding window size. This predetermined number may be greater than one. The CS connection protocol may be correct despite the efforts of faulty server replicas who may try to disrupt the protocol, including (but not limited to) the following faulty behaviors: refusing to accept a connection request from the client, refusing to send data acknowledgements or sending them after a delay, sending data acknowledgements with improper content, and/or dropping incoming messages, requesting too many retransmissions.

The CS connection protocol may prevent faulty clients from causing the correct server replicas to expend an arbitrary amount of resources (bandwidth and CPU). The CS connection protocol may ensure reliable, FIFO delivery even when some of the correct servers may have fallen behind in the execution of events.

The CS connection protocol may enable the server replicas to amortize across CS connections the computational cost of digitally signing data acknowledgements, thus helping the protocol to scale as the number of clients (e.g., CS connections) increases. The CS connection protocol may enable the server replicas to aggregate data acknowledgements within a CS connection, thus saving bandwidth and computation.

The SC connection protocol may correctly implement a logical channel from a set of potentially faulty server replicas to a potentially faulty client, rather than just from one correct process to another. The logical channel from the server replicas to a client may be reliable and FIFO. The "push" channel approach need not be used. Here, the connection cannot be terminated unless at least (f+1) server replicas (at least one of which is correct) believe it should be terminated.

The SC connection protocol may be correct despite the efforts of faulty server replicas who try to disrupt the protocol, including (but not limited to) the following faulty behaviors: refusing to initiate a connection to the client, refusing to send data messages or sending them after a delay, sending data messages with improper content, dropping incoming data acknowledgements, and/or attempting to cause the client to use up an arbitrary amount of memory, such as by sending data messages with arbitrarily high sequence numbers.

The SC connection protocol may prevent faulty clients from causing the server replicas to expend an arbitrary amount of resources (bandwidth and CPU) by not adhering to the protocol. The SC connection protocol need not require the server replicas to agree on the order in which to process data acknowledgements. Accordingly, the overhead may be kept relatively low even as the number of SC connections increases.

Scalable Logical Timeout Protocol

As described above, a logical timeout protocol may be used to enable the server replicas to agree on the logical point in the execution at which some action should be taken based on the passage of time. In addition, since a SCADA Server may set many timeouts, the protocol may scale as the number of timeouts set increases.

A serve replica may set a logical timeout only while it is executing some other event, and this execution may take place at the same logical point in time at all of the replicas. As a result, over the entire execution history, each replica sets the same timeouts in exactly the same order. If each replica were to assign an increasing sequence number to each timeout that it sets, each replica would assign the same sequence number to the same timeout.

The logical timeout protocol described below directly leverages this intuition. Replicas may use sequence numbers to consistently refer to the timeouts that have been set. Each replica may, according to a function of its local clock, introduce for ordering (via the state machine replication protocol) a TIMEOUT-REQUEST message containing its current local clock value and the sequence number of the last timeout it set. From the ordered stream of TIMEOUT-REQUEST messages, each replica can deduce the logical time at which a given timeout should expire. This logical time may occur when the $(f+1)^{st}$ replica would have locally expired the timeout, ensuring that enough time passed for the at least one correct replica.

The number of messages required for the replicas to agree on the expiration of any number of logical timeouts set in a given time interval may be constant. The TIMEOUT-REQUEST messages may always be sent at the same rate regardless of how many timeouts were set since the last one was sent. This approach is an alternative to an approach by which replicas send one TIMEOUT-REQUEST message per logical timeout, and thus the agreement overhead increases as the number of logical timeouts increases.

Each message sent by a server replica may contain a field called id, which contains the identifier of the sending server replica. In the definition provided below, the time_t type may be a structure containing two fields: sec and usec, corresponding to the seconds and microseconds field of a timestamp.

The following message types may be used in the logical timeout protocol:

```
timeout_request_message {
    time_t timestamp;  //Local timestamp of sending server
    int    seq;        //Sequence number of last timeout set
}
```

As described below, the TIMEOUT-REQUEST message may be encapsulated within the message used by the Byzantine fault-tolerant state machine replication protocol to introduce an event for ordering.

Each server may maintain the following data structures:
  num_outstanding_timeouts: The number of logical timeouts which have been set but which have not yet expired or been cancelled. This value may be initialized to 0.
  my_last_timeout_set: Sequence number of the last logical timeout this server has set. This value may be initialized to 0.
  latest_timeout_set_exec[NUM_SERVERS]: Entry i may contain the maximum sequence number contained in a TIMEOUT-REQUEST message from i that this server has executed. Each entry may be initialized to 0.
  latest_timestamp[NUM_SERVERS]: Entry i contains the latest timestamp contained in a TIMEOUT-REQUEST message from i that this server has executed. This value may be initialized to (0, 0).
  timeout_queue: Stores a slot for each outstanding timeout, indexed by sequence number, seq.
  Each slot contains the following fields:
  start_time[NUM_SERVERS]: Entry i contains either (0, 0) or the timestamp contained in the first executed TIMEOUT-REQUEST message from i with a sequence number field greater than or equal to seq. Each entry may be initialized to (0, 0).
  triggers[NUM_SERVER_SLOTS]: Entry i is set to TRUE when a TIMEOUT-REQUEST message from server i contributes to the expiration of this timeout. Each entry may be initialized to FALSE.
  num_triggers: The number of TRUE entries in the triggers[ ] array. This value may be initialized to 0.
  duration: Length of the timeout.

A server replica may set a logical timeout in response to executing some event (either the reception of a message or the expiration of a different logical timeout), and thus it is done in agreement with the rest of the replicas. When the replica sets a logical timeout, the replica may assign the logical timeout a new sequence number (reflected in the my_last_timeout_set variable, see line A3 below) and stores the timeout duration in its data structure (line A4). Similarly, cancelling a logical timeout is done in response to executing some event. The replica removes the state associated with the timeout (line B3). For efficiency, a replica keeps track of the number of outstanding timeouts (i.e., timeouts that have neither expired nor been cancelled) so that it can avoid introducing TIMEOUT-REQUEST messages when there are no timeouts set.

A1. Upon setting a logical timeout with duration d:
A2. Increment num_outstanding_timeouts
A3. Increment my_last_timeout_set
A4. Set timeout_queue[my_last_timeout_set].duration to d
B1. Upon cancelling a logical timeout:
B2. Decrement num_outstanding_timeouts
B3. Remove the corresponding slot from timeout_queue Each server replica may periodically check to see if the server has any outstanding timeouts. If so, the server may introduce for ordering a TIMEOUT-REQUEST message containing the server's local clock value and the sequence number of the last logical timeout it set (see Block C). The TIMEOUT-REQUEST messages may only be introduced for ordering where there are unexpired timeouts, and thus the protocol may impose no overhead if the server application does not set any logical timeouts (or after all set timeouts are no longer outstanding).

C1. Periodically:
C2. If num_outstanding_timeouts>0:
C3. Let m=<TIMEOUT-REQUEST, currentTime, my_last_timeout_set>
C4. Introduce m for ordering When a server replica executes a TIMEOUT-REQUEST message from server i, the server may first make sure that the message has a later timestamp than any other TIMEOUT-REQUEST from i that has already been executed. If not, the message is discarded (line D2) because it is out of date. The replica may then record the new timestamp from i (line D3). The replica may also discard the message if the sequence number field is less than the maximum sequence number contained in a previously executed TIMEOUT-REQUEST from i (line D4).

In lines D5-D7, the replica may set the start_time field, if not already set, for each sequence number, j, between the maximum sequence number contained in a previously executed TIMEOUT-REQUEST from i and the minimum of this TIMEOUT-REQUEST's sequence number and the sequence number of the last timeout the replica has set. Intuitively, the replica records the timestamp associated with the first executed TIMEOUT-REQUEST indicating that i has set the timeout with sequence number j. The reason for using the minimum function in Line D5 is subtle but important. Without this, a faulty server i could send a TIMEOUT-REQUEST with an arbitrarily high sequence number, causing a correct replica to loop through many sequence numbers, even ones associated with timeouts that have not been set by any correct replica. Conversely, using the minimum function still enables the correct replica to consider all relevant sequence numbers when i is correct: since this TIMEOUT-REQUEST is being executed, the correct replica must have already set the logical timeout for any sequence number less than or equal to seq.

In the remainder of Block D, the replica sees if any outstanding timeouts can be expired. To expire a timeout, the replica must have executed at least (f+1) TIMEOUT-REQUEST messages, from different replicas, indicating that enough time has passed at each such replica since that replica first set the given timeout. These conditions are captured in lines D10-D12. If the conditions hold for server i, then in line D13 the replica increments the num_triggers variable associated with the given timeout. If the number of triggers reaches (f+1), then the replica agrees to expire the timeout.

The computation in Block D may be entirely deterministic, based on the ordered sequence of TIMEOUT-REQUEST messages. Thus, all correct replicas agree to expire each logical timeout at the same logical point in the execution.

D1. Upon executing<TIMEOUT-REQUEST, ts, seq>, m, from server i:
D2. Discard m if ts<=latest_timestamp[i]
D3. Set latest_timestamp[i] to ts
D4. Discard m if seq<latest_timeout_set_exec[i]
D5. For j=last_timeout_set_exec[i]+1 to MIN(seq, my_last_timeout_set):
D6. If timeout_queue[j].start_time[i]==(0, 0):
D7. Set timeout_queue[j].start_time[i] to ts
D8. Set latest_timeout_set_exec[i] to seq
D9. For each outstanding timeout with seq s:
D10. If timeout_queue[s].start_time[i]!=(0, 0) and
D11. timeout_queue[s].triggers[i]==FALSE and
D12. (latest_timestamp[i]-timeout_queue[s].start_time[i])>timeout_queue[s].duration:
D13. Increment timeout_queue[s].num_triggers
D14. Set timeout_queue[s].triggers[i] to TRUE
D15. If timeout_queue[s].num_triggers (f+1):
D16. Expire logical timeout s
D17. Remove slot s from timeout_queue
D18. Decrement num_outstanding_timeouts Client-to-Servers (CS) Connection The logical connection from a client to the server replicas (which may be referred to herein as a CS connection) may be a unidirectional, non-blocking, reliable, FIFO channel. The CS connection may be implemented via a selective repeat sliding window protocol with cumulative acknowledgements (by the server replicas as a group) and negative acknowledgements (by individual replicas). The client may send data messages to (f+1) replicas but may receive data acknowledgements from any of the (3f+1) replicas. Since f of the replicas may be faulty, the client cannot act on a single acknowledgement; rather, must wait until it has collected proof that the content of the acknowledgement is valid.

The client may maintain a bounded-size queue to hold messages that have been sent but have not yet been placed into the sliding window because the latter is full. If a message is sent when the queue is full, the send function returns a WOULDBLOCK signal to the client, just as a standard non-blocking socket would.

Figure 3:
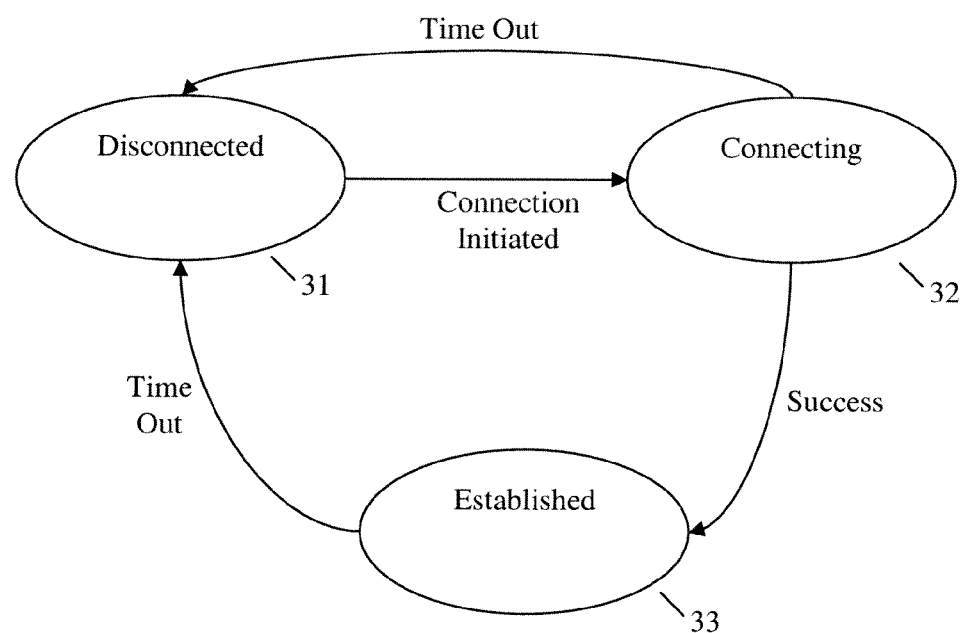
FIG. 3 is a state diagram illustrating a CS connection, from the client's perspective, according to exemplary embodiments of the present invention.

FIG. 3 is a state diagram illustrating a CS connection, from the client's perspective, according to exemplary embodiments of the present invention. A CS connection may begin in the DISCONNECTED state 31. When the client initiates a connection to the servers, the CS connection may enter the CONNECTING state 32. If the connection times out, then it enters the DISCONNECTED state 31. If the connection succeeds, it enters the ESTABLISHED state 33. If the connection times out while in the ESTABLISHED state 33, it enters the DISCONNECTED state 31.

Each CS connection may be associated with an instance number, which may uniquely identify this instance of the connection. One exemplary implementation of the instance number is the client's local clock value at the time the connection is initiated.

A CS connection may be implemented via two sub-protocols, one implemented by the client and the other implemented by each server replica.

All messages sent by a server replica may contain a field called id, which may contain the identifier of the server.

In the definitions below, the time_t type may be a structure containing two fields: sec and usec, corresponding to the seconds and microseconds field of a timestamp.

The following message types may be used in the CS connection:

```
cs_connect_request_message {
    int client_id;    //Identifier of client making the request
    time_t instance; //Proposed instance (timestamp)
}
cs_connect_ack_message {
    int client_id;    //Identifier of client who sent request
    time_t instance; //Instance number from corresponding request
}
cs_data_message {
    int client_id;    //Identifier of client sending the message
    time_t instance;  //Instance established in connection phase
    int seq;          // Sequence number of this message
    /* The data follows */
}
cs_data_ack {
```

```
    int client_id;   //Identifier of client who sent the data message
    time_t instance; //Instance of the connection
    int aru;         //All-received-up-to value, based on execution
    int num_nacks;   //Number of negative acknowledgements
                     to follow
    /* List of nacks follows */
}
```

Each client may maintain the following data structures for its CS connection:

state: The current state of the connection. One of DISCONNECTED, CONNECTING, or ESTABLISHED. This value may be initialized to DISCONNECTED.

current_instance: A times amp that is the instance number associated with the current connection. This value may be initialized to (0, 0).

connect_ack_received[NUM_SERVERS]: Array indicating whether the client has received a CS-CONNECT-ACK from each server for the current connection. Each entry may be initialized to FALSE.

num_connect_acks_received: The number of TRUE entries in connect_ack_received[ ] array. This value may be initialized to 0.

weak_majority_set: Set of (f+1) server identifiers to which the client sends its CS-DATA messages. This value may be initialized to the empty set.

latest_cs_data_ack_aru[NUM_SERVERS]: For each server i, stores the latest aru value received in a CS-DATA-ACK message sent by server i for this instance of the connection. Each entry may be initialized to 0.

server_wide_aru: The highest sequence number that the client knows at least one correct server has executed. This value may be initialized to 0.

window_start: Sequence number of the first unacknowledged packet in the window. This value may be initialized to 1.

window_queue: Queue of sent messages that have not yet been placed in the window.

In addition, the client may be configured with the following constants:

CS_WIN_SIZE: The size of the sliding window between client and server.

CS_QUEUE_SIZE: Maximum number of elements in the window_queue

To initiate a CS connection to the servers, a client may choose a new instance number for the connection (line A4) and then may send a CS-CONNECT-REQUEST message to a set of (f+1) servers. Since at most f servers are faulty, at least one correct server may receive the request.

A1. To connect to the servers:
A2. Reset connection state
A3. Set state to CONNECTING
A4. Set current_instance to the current local time.
A5. Send CS-Connect-Request message to (f+1) servers The client may wait for (f+1) CS-CONNECT-ACK messages from different servers, each with an instance number matching the client's current instance. If the requisite responses arrive, then the CS connection shifts to the ESTABLISHED state, and the client initializes its weak majority set to the set of (f+1) servers who responded (lines B6-B7). The client may periodically retransmit its CS-CONNECT-REQUEST until the requisite responses arrive or the connection times out (not shown).

B1. Upon receiving CS-Connect-Ack message, m:
B2. Run CS_Connect_Ack_Conflict_Filter(m)
B3. Set connect_ack_received[m.id] to TRUE
B4. Increment num_connect_acks_received
B5. If num_connect_acks_received ==(f+1):
B6. Set state to ESTABLISHED
B7. Initialize weak_majority_set to the (f+1) who responded
C1. CS_Connect_Ack_Filter(cs_connect_ack_message m):
C2. Discard if m.client_id!=my_client_id
C3. Discard if state!=CONNECTING
C4. Discard if m.instance!=current_instance
C5. Discard if connect_ack_received[m.id]==TRUE To send a message to the servers, the client may attempt to place the message into the sliding window. If there is space in the window, then the client may encapsulate the message in a CS-DATA message, add the message to the window, and send the message to the servers in its weak majority set (initialized in line B7). If there is no space in the sliding window, then the client may attempt to place the message onto the window queue. If there is space, the client may place the message in a queue, which may be sent later when space in the sliding window opens up (line D5). If there is no space on the window queue, then the client may receive a WOULDBLOCK signal, indicating that the message cannot be sent at the current time because the client is sending faster than the servers (as a group) can receive.

D1. To send a message, m, to the servers:
D2. If space in window:
D3. Add m to the window
D4. Send m to weak majority set
D5. If no space in window but space on window_queue, add m to window_queue
D6. If no space on window_queue, return WOULDBLOCK signal to client.

To slide its window, the client receives a data acknowledgement from the group of servers that indicates the message at the front of the window has been received and executed. Since up to f servers may be faulty, the client is only convinced that the servers have executed sequence number seq when it receives messages from at least (f+1) different servers who indicate they have executed sequence numbers at least as high as seq. For each server i, the client maintains the maximum sequence number acknowledged by i this instance in latest_cs_data_ack_aru[i]. The set of values are used to deduce server_wide_aru, the maximum sequence number that the client is convinced has been executed by the servers this instance (line E5 and Block G). If the window slides, then the client moves as many messages from the window queue to the window as will fit (line E8).

Each CS-DATA-ACK message from server i may also contain a list of sequence numbers that i is missing. The client retransmits sequence number seq to server i if: (1) server s in the client's weak majority set; (2) seq is in the client's window; (3) server has not already acknowledged a sequence number greater than or equal to seq; and (4) enough time has elapsed since the last time the client retransmitted seq to server i (lines E9-E13).

The client periodically retransmits the last CS-DATA message it has sent if there exists an unacknowledged packet at the front of the window for a long enough period of time. If the timeout expires enough times, then the state of the connection shifts to DISCONNECTED and the client terminates the connection (not shown).

E1. Upon receiving CS-Data-Ack message, m:
E2. Run CS-Data-Ack_Filter(m)
E3. If m.aru>latest_cs_data_ack_aru[m.id]:
E4. Set latest_cs_data_ack_aru[m.id] to m.aru E5. Update_Server_Wide_Aru( )
E6. If updated:
E7. Try to slide the window
E8. Add as many queued messages to window as will fit
E9. Respond to nack for seq in m if:
E10. m.id is in my weak majority set,
E11. seq is in my window,
E12. m.id has not already acknowledged a seq'>=seq,
E13. and it has been long enough since I retransmitted seq to m.id
F1. CS_Data_Ack_Filter(cs_data_ack_message m):
F2. Discard if m.client_id!=my_client_id
F3. Discard if state!=ESTABLISHED
F4. Discard if m.instance!=current_instance
G1. Update_Server_Wide_Aru( ):
G2. Sort latest_cs_data_ack_aru values
G3. Set server_wide_aru to the 2f+1st lowest value in the sorted array Within the client algorithm, faulty servers cannot unilaterally cause the client to terminate the connection. CS-DATA messages are sent to (f+1) servers, and all servers send CS-DATA-ACK messages back to the client, so the faulty servers can neither block messages from being received and executed nor block acknowledgements from being sent.

Moreover, faulty servers cannot arbitrarily increase the client's server_wide_aru value by sending CS-DATA-ACK messages containing high aru values. This ensures that a client will only slide its window past a sequence number if it is assured that at least one correct server has executed the message. The internal properties of the state machine replication ordering protocol ensure that all correct servers will eventually execute the message.

Faulty servers cannot cause the client to expend an arbitrary amount of resources retransmitting messages because the client limits the rate at which it is willing to respond to retransmission requests for each sequence number. In addition, if a faulty server ever sends an acknowledgement for sequence number seq, it forfeits its ability to subsequently request retransmission for any sequence number less than or equal to seq.

Each server may maintain the following data structures for each CS connection:
   time_t current_instance: The current instance associated with the connection. This value may be initialized to (0, 0).
   max_known_seq: Maximum sequence number sent by the client in a CS-DATA message during this instance of the connection. This value may be initialized to 0.
   window_start: Sequence number of the next packet to introduce for ordering. This value may be initialized to 1.
   execution_window_start: Sequence number of the next packet to be executed. This value may be initialized to 1.
   last_introduced_for_ordering: Instance number of the last CS-CONNECT-REQUEST introduced for ordering for this client. This value may be initialized to (0, 0).

In addition, each server may be configured with the following constants:
   CS_WIN_SIZE: The size of the sliding window between client and server.

Servers may handle at least two distinct types of events. The first is the reception of a message, which occurs when the server receives the message from the network. The second is the execution of a message, which occurs when a server has ordered the message in agreement with the other servers. All correct servers execute messages in the same order. Messages that must be ordered and ultimately executed are introduced for ordering by a server.

When a server receives a CS-CONNECT-REQUEST message, it first runs a filter on the message to see if it can be discarded (line A2, and see Block B). A server discards the message if it has already established a connection with this client from a later instance (line B2); it has already introduced a request from this or a later instance for ordering (line B6); or it has not been enough time since the server introduced a request from this client for ordering (line B7). In addition, if the request is for the currently established instance, the server retransmits its CS-CONNECT-ACK message to the client if enough time has elapsed since its last retransmission (line B4). The message can then be discarded (line B5).

If the CS-CONNECT-REQUEST message passes through the filter without being discarded, then the server introduces the request for ordering (lines A3-A4).
   A1. Upon receiving CS-Connect-Request message, m:
   A2. Run CS_Connect_Request_Filter(m)
   A3. Set last_introduced_for_ordering to m.instance
   A4. Introduce m for ordering
   B1.   CS_Connect_Request_Filter(cs_connect_request_message
   B2. Discard m if current_instance>m.instance
   B3. If m.instance==current_instance:
   B4. Retransmit my latest cs_connect_ack to client if been enough time
   B5. Discard m
   B6. Discard m if m.instance<=last_introduced_for_ordering
   B7. Discard m if it not long enough since I introduced one for ordering When a server executes a CS-CONNECT-REQUEST message with a later instance than the current one for this client, the server resets the connection and sends a CS-CONNECT-ACK message to the client (line C5), indicating that the server considers the new instance of the connection to be established.
   C1. Upon executing CS-Connect-Request message, in:
   C2. If m.instance>current_instance:
   C3. Reset connection for this client
   C4. Set current_instance to m.instance
   C5. Send a CS-Connect-Ack message to the client When a server receives a CS-DATA message from a client, it may first run a filter on the message to see if the message can be discarded (line D2, and see Block E). The server discards the message if it is not for the current instance (line E2); the sliding window has already moved past the sequence number (line E5); or if the sequence number has already been executed (line E6). In addition, if the sequence number of the message is equal to the maximum sequence number received from the client in this instance, then the server retransmits its last CS-DATA-ACK message if enough time has elapsed since the last time the server retransmitted a CS-DATA-ACK message (lines E3-E4).

If the CS-DATA message passes through the filter without being discarded, then the server first tries to implicitly advance the sliding window based on the sequence number, seq (lines D3-D4). If seq is past the end of the server's window, then if the client is correct, it must have already been convinced that a correct server acknowledged one or more of the packets in this server's window. This property holds because a correct client only sends a packet with sequence number seq if the servers have acknowledged (seq-CS_WIN_SIZE) or higher. Thus, this server can advance its window to (seq-CS_WIN_SIZE+1).

In line D5, the server updates its max_known_seq variable. The operation of max_known_seq is described in detail below.

The server next tries to add the packet to its sliding window. Since the server implicitly advanced its window in lines D3 and D4, and since the filter discarded old messages, the packet necessarily falls within the window. If the packet is the next one needed in order, then the server slides its window and introduces packets for ordering starting from the beginning of the window, until it reaches a hole (line D7). If the packet was added to the window but was out of order, then the server schedules the sending of a CS-DATA-ACK message if one is not already scheduled (line D8). This allows the server to send negative acknowledgements. For example, the server may include a negative acknowledgement for each hole in its window, up to (but not including) max_known_seq. Finally, if the server already had the packet in its window but it as out of order, the server schedules the sending of a CS-DATA-ACK so that it can send negative acknowledgements (line D9).

D1. Upon receiving CS-Data message, m:
D2. Run CS_Data_Filter(m)
D3. If m.seq>=window_start+CS_WIN_SIZE:
 //Implicitly advance window
D4. Set window_start to (m.seq-CS_WIN_SIZE+1)
D5. If m.seq>max_known_seq, set max_known_seq to m.seq
D6. Attempt to add packet to window:
D7. If added in order, introduce contiguous packets for ordering
D8. If added out of order, send CS-DATA-ACK if not already scheduled
D9. If already have the packet but it's out of order, send CS-DATA-ACK if not already scheduled.
E1. CS_Data_Filter(cs_data_message m):
E2. Discard m if m.instance!=current_instance
E3. If m.seq==max_known_seq:
E4. Retransmit my last CS-Data-Ack if been long enough
E5. Discard m if m.seq<window_start
E6. Discard m if m.seq<execution_window_start When a server executes a CS-DATA message, it first runs several checks to determine if the packet should be executed. The server discards the packet if it is no longer for the current instance, or if no CS connection has ever been established (lines F2-F3). Note that both cases are possible: a faulty server may collude with a faulty client to introduce a message before the connection has been established, or the client may have timed out and initiated a new connection (which was subsequently established) while an old CS-DATA message was still being ordered. The server also discards the message if the message is for the correct instance but has a sequence number beyond the end of the execution window (line F4). This indicates that the client is faulty, because a correct client would not have been able to slide its window and send a message with the given sequence number unless (f+1) servers had acknowledged the sequence number at the beginning of the execution window (which has not happened yet). All subsequent messages from this faulty client can be discarded. Finally, the server discards the message if it is not the next packet to be executed in order (line F5).

If the message can be executed, the server slides the execution window forward (line F6) and executes the message. The server then schedules the sending of a CS-DATA-ACK message if one is not already scheduled to be sent. The CS-DATA-ACK message includes the sequence number of the last CS-DATA message executed for this client.

F1. Upon executing CS-Data message, m:
F2. Discard m if current_instance==(0, 0)
F3. Discard m if m.instance!=current_instance
 //Faulty client!
F4. Discard m if m.seq>=(execution_window_start CS_WIN_SIZE)
F5. Discard m if m.seq!=execution_window_start
F6. Increment execution_window_start and execute the message.
F7. Send a CS-DATA-ACK message if one not already scheduled to be sent In line D4 of the procedure provided above, a server implicitly slides its local window forward based on the sequence number of the received CS-DATA message. This step allows a server to continue processing messages (and introducing them for ordering) even if its local window becomes out of sync with the client's sliding window.

For example, where CS_WIN_SIZE is set to 5, and the client's window is currently between sequence numbers 50 and 54, the local window of a correct server (call it X) may still be between 1 and 5. This may occur as in a Byzantine fault-tolerant state machine replication system, f servers (even correct ones) may fall behind in the execution of events. Where X is one of these f trailing servers, then the client could continue to slide its window forward without X sliding its local window by "working with" the up-to-date servers, which continue executing and sending the acknowledgements that open up space in the client's window.

Thus, without line D4, a correct server would discard subsequent CS-DATA messages from the client, since they are out of the server's local window. However, if this server were in the client's weak majority set (e.g., the f+1 servers to which the client sends CS-DATA messages), and the other f servers in the weak majority set become faulty, the client would not be able to get any of its packets through. Thus, line D4 enables a correct server to continue participating in the protocol, even if it fell behind in execution, while still enabling the client to send to only f+1 servers. An alternative approach may have the client send to 2f+1 servers rather than f+1, and this may result in much more bandwidth being used.

According to exemplary embodiments of the present invention, faulty clients do not cause the servers to consume an arbitrary amount of resources ordering CS-CONNECT-REQUEST messages, because the servers limit the rate at which they are willing to introduce these messages for ordering (line B7).

A faulty client does not cause the servers to order its CS-DATA messages at an arbitrary rate. Although a server advances its window in line D4, a client who sends a CS-DATA message with a sequence number past the end of the servers' collective execution window will be detected as faulty.

Servers send acknowledgements (and slide their execution window) as a logical entity but send negative acknowledgements individually (based on their local window; see lines D8-D9). This separation allows for faster packet recovery in the face of loss, because a server need not wait until an out-of-order message is ordered before requesting a retransmission.

Servers-to-Client (SC) Connection

The logical connection from the server replicas to a client (referred to herein as an SC connection) is a unidirectional, non-blocking, reliable, FIFO channel. The SC connection may be implemented via a selective repeat sliding window protocol with cumulative acknowledgements and negative acknowledgements. Each server replica sends data messages to the client, and the client sends data acknowledgements (and negative acknowledgements) to each replica.

Figure 4:
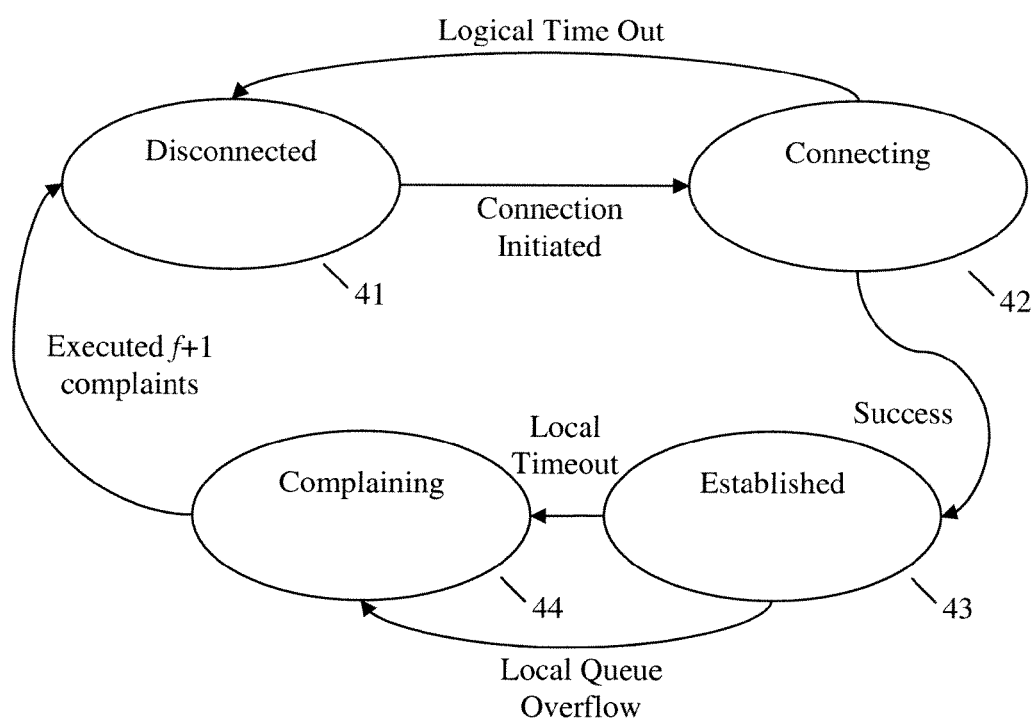
FIG. 4 is a state diagram illustrating an SC connection from a replica's perspective according to exemplary embodiments of the present invention.

FIG. 4 is a state diagram illustrating an SC connection from a replica's perspective according to exemplary embodiments of the present invention. Differences between this figure and the state diagram of a CS connection of FIG. 3 are discussed below. The SC connection begins in the DISCONNECTED state 41. When the replicas initiate a connection to a client, the SC connection enters the CONNECTING state 42. At this point, the replicas set a logical timeout on the completion of the connecting phase. If the logical timeout expires before the connection succeeds, the SC connection is terminated and enters the DISCONNECTED state 41. If the connection succeeds before the logical timeout expires, then the logical timeout is cancelled and the SC connection enters the ESTABLISHED state 43. Once in the ESTABLISHED state 43, the SC connection remains there unless and until one of two events occurs. The first is that a given replica expires a local timeout, for example, this replica did not receive an expected data acknowledgement within a predetermined timeout period. The second is when a given replica's local window queue overflows, indicating that the server application is sending faster than the client can receive. In either case, the replica enters the COMPLAINING state 44. The transition from the ESTABLISHED state 43 to the COMPLAINING state 44 is not done in agreement with the other replicas; rather, it is a local operation based on events locally observed by the replica. If enough replicas complain, then the SC connection is terminated and enters the DISCONNECTED state 41. Note that this final action is done in agreement with the other replicas.

Each SC connection may be associated with an instance number, which uniquely identifies the particular instance of the connection. An SC connection is implemented via two sub-protocols, one implemented by the server replicas and one implemented by the client.

Each server maintains the following data structures for its SC connection:
- state: Current state of the SC connection. One of: DISCONNECTED, CONNECTING, ESTABLISHED, and COMPLAINING. This value may be initialized to DISCONNECTED.
- current_instance: The current instance number of the connection. This value may be initialized to 0.
- next_instance: The next instance number to assign to an SC connection. This value may be initialized to 1.
- latest_sc_connect_ack_received: The latest instance number received in an SC-CONNECT-ACK message from this client. This value may be initialized to 0.
- latest_sc_connect_ack_executed: The latest instance number of an SC-CONNECT-ACK message from this client that was executed. This value may be initialized to 0.
- window_start: Sequence number of the first unacknowledged packet in the window. This value may be initialized to 1.
- window_queue: Queue of sent messages that have not yet been placed into the window.
- current_tail: Sequence number of the next open slot in the window. This value may be initialized to 1.
- max_client_aru: The maximum sequence number cumulatively acknowledged by the client this instance. This value may be initialized to 0.
- complaint_executed[NUM_SERVERS]: Entry i is TRUE if this server has executed an SC-COMPLAINT message from server in this instance. Each entry may be initialized to 0.
- num_complaints_executed: Number of TRUE entries in complaint_executed[ ] array.

In addition, each server may be configured with the following constants:
- SC_WIN_SIZE: Size of the sliding window for the SC connection.
- SC_QUEUE_SIZE: Maximum number of messages that can be held on the window_queue.

To initiate a connection to a client, the server sets the state of the connection to CONNECTING, assigns a new instance number to the connection, and then sends an SC-CONNECT-REQUEST message to the client (lines A2-A4). The server then also sets a logical timeout on the connection attempt. The logical timeout enables the servers to agree on whether the connection attempt succeeds or fails. If the logical timeout expires before the connection succeeds, the connection is terminated and the server application notified.

A1. To connect to client with timeout T:
A2. Set state to CONNECTING
A3. Set current_instance to next_instance and increment next_instance
A4. Send SC-Connect-Request message to client
A5. Set logical timeout for T When a server receives an SC-CONNECT-ACK message, it first runs a filter on the message (line B2) to determine if the message should be processed or discarded (see Block C). If the message passes through the filter, then the server records the instance number of the SC-CONNECT-ACK (line B3) and introduces the message for ordering (line B4). Recording the instance number ensures that a server introduces for ordering an SC-CONNECT-ACK for a given instance number at most once, and that the server introduces SC-CONNECT-ACK messages with monotonically increasing instance numbers. The filter in Block C does not require the instance number of the message to match the server's current instance number; this allows a server to introduce a new SC-CONNECT-ACK for ordering even if the server has fallen behind in execution.

B1. Upon receiving SC-Connect-Ack message, m:
B2. Run SC_Connect_Ack_Filter(m)
B3. Set latest_connect_ack_received to m.instance
B4. Introduce m for ordering
C1. SC_Connect_Ack_Filter(sc_connect_ack_message m):
C2. Discard m if m.instance<=latest_sc_ connect_ack_received
C3. Discard m if m.instance<=latest_sc_ connect_ack_executed When a server executes an SC-CONNECT-ACK message, it first checks to make sure that it has not already executed an SC-CONNECT-ACK with this or a later instance number. If it has, then the message is discarded and no further action is taken (line D2). If the SC-CONNECT-ACK is for a new instance, then the server records the instance number (line D3). If the current state of the connection is not CONNECTING, then the server stops processing the message (line D4). Since all correct server replicas execute events in the same order, the execution of the event that caused the state of the connection to be set to CONNECTING (line A2 above) necessarily precedes the execution of this SC-CONNECT-ACK (assuming the client is correct). Therefore, the check in line D4 will return the same result at all correct servers, even if they operate at different speeds. In line D5, the server cancels the logical timeout associated with the connection (see line A5 above). It then sets the state of the connection to ESTABLISHED and tries to add queued messages (if any are present) to the window so that they can be sent.

D1. Upon executing SC-Connect-Ack message, m:
D2. Discard if m.instance<=latest_ sc_connect_ack_executed
D3. Set latest_sc_connect_ack_executed to m.instance
D4. If state!=CONNECTING, return
D5. Cancel logical timeout associated with connection
D6. Set state to ESTABLISHED and try to add queued messages to window To send a message to a client, the server encapsulates the message in an SC-DATA message and then attempts to add the message to the window.

E1. To send message m to client:
E2. Construct SC-Data message, m.
E3. Add_SC_Data_To_Window(m)

Whether a message can be added to the window depends on the current state of the connection and whether the window is full. If the state of the connection is DISCONNECTED, or if the server has already begun complaining on the connection (described below), then the message is discarded and no further processing is performed (line F2). If the connection is currently in the CONNECTING state, then the server adds the message to the window queue if there is space (line F5). If there is no space on the window queue, then the server application is sending faster than the application can receive, and the server begins complaining on the connection (see Block G). The server sets the state of the connection to COMPLAINING (line G2) and introduces an SC-COMPLAINT message for ordering. The server attempts to cause the set of servers, as a group, to agree that the connection should be terminated.

If there is space in the window, then the server adds the message to the window (at the location indicated by current_tail), sends the message to the client, and schedules the retransmission of the last SC-DATA message (lines H7-H9). However, it is possible that the client has already acknowledged the message that the server was about to send (line H2). This can happen because the max_client_aru field is updated in response to receiving an SC-DATA-ACK message (see line J3 below). When this occurs, the server increments current_tail but does not send the message to the client. The server also advances the beginning of its window to the minimum of the previous current_tail and max_client_aru (line H5). All sequence numbers before this new value of window_start have been cumulatively acknowledged by the client. Using the minimum function prevents the window_start and the current_tail from crossing.

F1. Add_SC_Data_To_Window(sc_data_message m):
F2. If state==DISCONNECTED or COMPLAINING, return.
F3. If m.instance!=current_instance, return.
F4. If state==CONNECTING:
F5. If space on window queue, add m to window_queue and return
F6. If no space on window queue, call Begin_Complaining( ) and return
F7. If there is space in window, call Place_Message_In_Window(m).
F8. If no space in window but space on window_queue, add to window_queue.
F9. If no space on window_queue, call Begin_Complaining( )
G1. Begin_Complaining( )
G2. Set state to COMPLAINING
G3. Construct SC_Complaint message and introduce it for ordering
G4. Cancel retransmission of last SC-Data message, if any exists.

H1. Place_Message_In_Window(sc_data_message m):
H2. If m.seq<=max_client_a
H3. Increment current_tail //Don't bother sending, already acked
H4. Cancel retrains of last SC-Data, if any exists.
H5. Advance window_start to MIN(current_tail-1, max_client_aru)
H6. Return
H7. Store m in window and increment current_tail
H8. Send m to client
H9. Schedule retransmission of last SC-Data message If a server executes (f+1) SC-COMPLAINT messages, from different servers and for the current instance, for a given SC connection, then the server terminates the connection. Since this action is taken upon execution, it occurs in agreement at all correct servers.

I1. Upon executing SC-Complaint message, m:
I2. Do nothing if current_instance!=m.instance
I3. Do nothing if already executed complaint from mid
I4. Set complaint_executed[m.id] to TRUE
I5. Increment num_complaints_executed
I6. If num_complaints_executed==(f+1) then terminate connection.

When a server receives an SC-Data-Ack message, it first runs a filter on the message (line J2) to determine if it should be processed (Block K). The message is discarded if the state of the connection is not ESTABLISHED or if it is not for the current instance.

If the SC-DATA-ACK message passes through the filter, then the server updates the max_client_aru variable if necessary and tries to advance its window. As above, the minimum function prevents the window_start and current_tail variables from crossing (line J4). If the acknowledgement opens up any space in the window, then the server moves messages from the window queue to the window while there is space. Next, the server responds to the negative acknowledgements in the SC-DATA-ACK message, if any are present. For each sequence number that was negatively acknowledged, the server retransmits the corresponding SC-DATA message to the client if (1) the sequence number falls within the server's window; (2) if the client indicates that it has not already received the message from this server; and (3) if enough time has elapsed since the last time this server retransmitted the message to this client. The last check prevents a faulty client from causing a server to retransmit messages at an arbitrary rate.

If the server retransmits a message too many times, it begins complaining on the connection (see Block G).

J1. Upon receiving SC-Data-Ack message, m:
J2. Run SC_Data_Ack_Filter(m)
J3. If m.aru>max_client_aru, set max_client_aru to m.aru
J4. Advance window to MIN(current_tail-1, max_client_aru)
J5. If window advanced, cancel retransmission of last SC-Data message
J6. If any unacknowledged SC-Data message in window:
J7. Schedule retransmission of last SC-Data
J8. Move messages from window_queue into window while there is space
J9. Respond to nacks in m:
J10. For each seq, send a retransmission to client if:
J11. seq is in window,
J12. My bit is not set in the corresponding bitmap, and
J13. Enough time has elapsed since I last retransmitted this seq
K1. SC_Data_Ack_Filter(sc_data_ack_message m):
K2. Discard m if state!=ESTABLISHED K3. Discard m if m.instance!=current_instance For the server sub-protocol, all correct servers agree on whether each SC connection is in the ESTABLISHED state or the DISCONNECTED state. This is achieved by executing all events that cause the connection to enter one of these two states (i.e., SC-CONNECT-ACK messages, SC-COMPLAINT messages, and the messages associated with agreeing on a logical timeout).

Servers do not order (and subsequently execute) SC-DATA-ACK messages. This dramatically reduces the performance overhead of implementing an SC connection, since during normal operation the servers do not need to order any messages to implement it; the only ordered messages are those used to change the state of the connection, which should happen infrequently.

One consequence of not ordering SC-DATA-ACK messages is that the servers may not have a consistent view of the current aru value of the client. As a result, they do not necessarily slide their local windows in agreement. For this reason, a server is unable to provide the application with a WOULDBLOCK signal, as was possible for the client in a CS connection. If throughput on the connection is expected to be low, the connection can be configured to allow the servers to order and execute SC-DATA-ACK messages, in which case the WOULDBLOCK signal could be provided.

The client maintains the following data structures for its SC connection:
- current_instance: Current instance number of connection. This value may be initialized to 0.
- latest_connect_request[NUM_SERVERS]: Maximum instance number ever received from each server in an SC-CONNECT-REQUEST message. Each entry may be initialized to 0.
- latest_known_seq[NUM_SERVERS]: Maximum sequence number received from each server in an SC-DATA message this instance. Each entry may be initialized to 0.
- max_known_seq: Maximum sequence number known to be sent by a correct server this instance. This value may be initialized to 0.
- ack_trigger[NUM_SERVERS]: Entry i is set to TRUE when a message from server i is counted towards triggering the sending of an acknowledgement. Each entry may be initialized to FALSE.
- num_ack_triggers: The number of TRUE entries in the ack_trigger[ ] array.

In addition, the client is configured with the following constants:
- SC_WIN_SIZE: Size of the sliding window for the SC connection When a client receives an SC-CONNECT-REQUEST message, it first runs a filter on the message (line L2) to determine if the message should be discarded (Block M). The message is discarded if it is for an older instance than the current one (line M3), or if this server has already sent an SC-CONNECT-REQUEST containing this or a later instance (line M7). If the instance number matches the current instance, and the client has previously sent an SC-CONNECT-ACK message to this server for this instance, the client retransmits its SC-CONNECT-ACK if enough time has passed since the last such retransmission (lines M4-M5).

If the SC-CONNECT-REQUEST passes through the filter, then the client tries to update its current instance number based on the contents of the latest_connect_request[ ] array. The client sets the current instance to the maximum number, n, such that at least (f+1) servers have sent SC-CONNECT-REQUEST messages containing instances greater than or equal to n (lines L5-L7). If the current instance is updated, then the client resets the SC connection and sends an SC-CONNECT-ACK message to a randomly-selected set of (f+1) servers.

L1. Upon receiving SC-Connect-Request message, m:
L2. Run SC_Connect_Request_Filter(m)
L3. Store m in latest_connect_request[m.id]
L4. Try to update current_instance:
L5. Sort values in latest_connect_request[ ] array
L6. If sorted_values[2f+1]>current_instance:
L7. Set current_instance to sorted_values[2f+1]
L8. If current_instance was updated:
L9. Reset SC connection
L10. Send SC-Connect-Ack to a weak majority set
M1. SC_Connect_Request_Filter(sc_connect_request_message m):
M2. Discard m if m.client_id!=my_client_id
M3. Discard m if m.instance<current_instance
M4. If m.instance==current_instance and m.id is one of the (f+1) servers to whom I've sent an SC-Connect-Ack:
M5. Retransmit my SC-Connect-Ack if enough time elapsed
M6. Discard m
M7. Discard m if latest_connect_request[m.id]>=m.instance When a client receives an SC-DATA message, it first runs a filter on the message (line N2) to determine if the message should be discarded (Block O). If the message passes through the filter, then the server attempts to update its max_known_seq variable. The max_known_seq is the maximum sequence number, n, such that the client knows at least one correct server has sent an SC-DATA message with sequence number greater than or equal to n (lines N3-N8). This value may be computed as a function of the latest_known_seq[ ] array, which stores, for each server, the maximum sequence number received in an SC-DATA message from that server.

In the remainder of Block N, the client determines if it can deliver any new messages, and it determines if it should send an SC-DATA-ACK message. The client attempts to deliver new messages when the reception of this SC-DATA message causes a packet to become valid. A client is convinced that a packet with sequence number seq is valid when the client receives (f+1) matching copies of the message, each from a different server. Since at most f servers are faulty, this guarantees that the content of the message is correct.

A client sends an SC-DATA-ACK message in two cases. The first case is when the client delivers a new valid packet, be it in-order or out-of-order (line N12-N15). The second case is when the client has received the (f+1)st copy of a message for its maximum known sequence number, each from a different server, and when enough time has passed since a message from each such server contributed toward the triggering of the sending of an SC-DATA-ACK (see Block P).

When a client sends an SC-DATA-ACK, it includes the list of sequence numbers between the start of its window and max_known_seq that have not yet become valid. For each sequence number, the client attaches a bitmap consisting of (3f+1) bits, where bit i is set if the client has already received an SC-DATA message with the given sequence number from server i. Thus, this is a compact representation of which servers should respond to the negative acknowledgement.

N1. Upon receiving SC-Data message, m:
N2. Run SC_Data_Filter(m)
N3. If m.seq>latest_known_seq[m.id]:
N4. Set latest_known_seq[m.id] to m.seq
N5. Try to update max_known_seq:
N6. Sort values in latest_known_seq[ ] array N7. If sorted_values[2f+1]>max_known_seq:
N8. Set max_known_seq to sorted_values[2f+1]
N9. Reset ack_triggers[ ] array
N10. Call Update_Ack_Trigger(m) and if num_ack_triggers==(f+1):
N11. Reset ack_triggers array and set should_send_ack flag
N12. If m is in my window, and
    I haven't already received a message from m.id with m.seq, and
    I don't already have a valid packet for m.seq:
N13. Store m
N14. If I now have (f+1) matching messages for m.seq:
N15. Set should_send_ack flag
N16. Set should_deliver flag
N17. If should_deliver flag is set:
N18. Deliver valid, contiguous packets and slide window
N19. If should_send_ack flag is set:
N20. Send SC-DATA-ACK message if not already scheduled to be sent.
O1. SC_Data_Filter(sc_data_message m):
O2. Discard m if m.client_id!=my_client_id
O3. Discard m if m.instance!=current_instance
P1. Update_Ack_Trigger(sc_data_message m):
P2. If ack_trigger[m.id] is already set, return.
P3. If m.seq<max_known_seq, return.
P4. If not enough time elapsed since update of ack_trigger[m.id], return.
P5. Set ack_trigger[m.id] to TRUE and increment num_ack_triggers.

In the client procedure outlined above, a faulty server that continually sends SC-CONNECT-REQUEST messages with higher and higher instance numbers cannot cause the client to terminate an established SC connection, because the client only moves to a higher instance when it is convinced that a correct server has proposed moving to such an instance.

Moreover, since a client only sends negative acknowledgements for sequence numbers less than or equal to max_known_seq, a faulty server that sends SC-DATA messages with arbitrarily high sequence numbers cannot cause the client to send negative acknowledgements for sequence numbers higher than the maximum sequence number sent in an SC-DATA message by a correct server.

The client aggregates acknowledgements just as it would if communicating with a single server rather than a replicated group of servers. In addition, the client only slides its window when it delivers messages whose content is known to be correct (and in order).

A faulty server cannot cause a client o send arbitrary SC-DATA-ACK messages. As described above, an acknowledgement is only sent in two cases. The first is when the client collects a newly valid packet, which cannot be caused unilaterally by faulty servers. The second is when the client receives (f+1) messages for max_known_seq, each of which has not been received for some time. This rate limits the acknowledgements in a way that cannot be controlled by the faulty servers.

Figure 5:
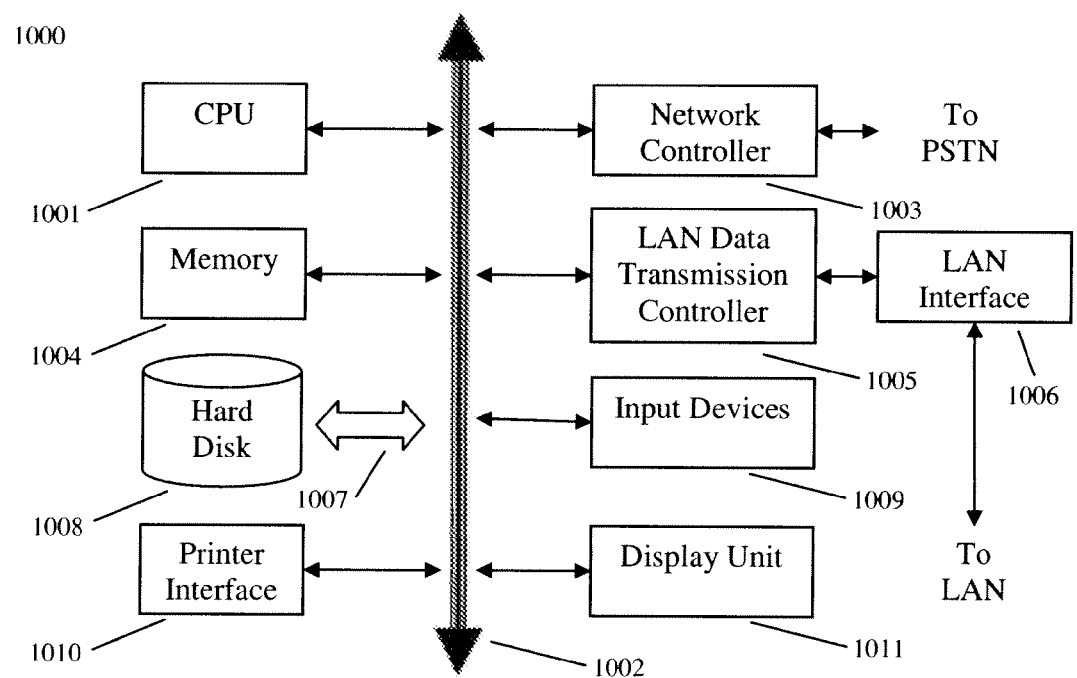
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for automatically monitoring and controlling an infrastructure or process, comprising:
a plurality of remote clients installed along various portions of an industrial infrastructure or an infrastructure performing a process, each of said remote clients collecting data pertaining to the infrastructure or process;
a plurality of server replicas in communication with said plurality of remote clients, receiving said collected data from said remote clients and processing said received data; and
an electronic network across which the plurality of remote clients and the plurality of server replicas communicate,
wherein said plurality of server replicas comprises a state machine replication system that is tolerant of a failure of one or more of said server replicas, and
wherein in the state machine replication system, each of the plurality of server replicas receive identical incoming message events and timeouts and process the incoming message events and timeouts in an identical order.

2. The system of claim 1, wherein the plurality of remote clients comprises a plurality of Remote Terminal Units (RTUs) or a plurality of Programmable Logic Controllers (PLCs).

3. The system of claim 1, wherein the plurality of server replicas comprises a plurality of Supervisory Control and Data Acquisition (SCADA) replica servers.

4. The system of claim 1, wherein said state machine replication system is tolerant of up to a predetermined number of Byzantine failures of said server replicas.

5. The system of claim 1, wherein each of the plurality of server replicas is configured to dynamically agree on an expiration of a plurality of logical timeouts.

6. The system of claim 5, wherein said agreement on the expiration of the plurality of timeouts includes exchanging a constant number of messages for any number of logical timeouts, within said plurality of timeouts, greater than or equal to one, wherein the size of said messages does not depend upon the number of logical timeouts.

7. The system of claim 1, wherein each of said plurality of server replicas is configured to send messages to one of said remote clients of said plurality of remote clients using a first protocol and is configured to receive messages from one of said remote clients of said plurality of remote clients using a second protocol that is different from said first protocol.

8. The system of claim 7, wherein said first protocol is a unidirectional logical channel for reliably sending a message from multiple sources to a single destination and for acknowledging, to one or more of the multiple sources, that the message has been successfully received.

9. The system of claim 8, wherein the first protocol is implemented via a selective repeat sliding window protocol with cumulative acknowledgments and negative acknowledgements where a server replica of the plurality of server replicas sends data messages to a client and the client sends data acknowledgments and negative acknowledgements.

10. The system of claim 8, wherein the single destination's acknowledgements of the receipt of the messages from the replica servers are processed by the replica servers without first ordering them.

11. The system of claim 7, wherein said first protocol provides for a server replica to vote to close a connection between the server replicas and a client as a local decision and said connection is closed when a predetermined number of replicas vote to close the connection.

12. The system of claim 7, wherein said second protocol is a unidirectional logical channel in which cumulative acknowledgements are used to advance a sliding window to a particular value when said cumulative acknowledgments acknowledging at least up to said particular value are received from a sufficient number of server replicas.

13. A method for automatically monitoring and controlling an infrastructure or process, comprising:
   collecting data pertaining to a function of an infrastructure or process at one or more clients;
   receiving said collected data at each of a plurality of server replicas, said plurality of server replicas comprising a fault-tolerant state machine replication system; and
   using said received data to monitor or control said infrastructure or process,
   wherein in the fault-tolerant state machine replication system, each of the plurality of server replicas receive identical incoming message events and timeouts and process the incoming message events and timeouts in an identical order.

14. The method of claim 13, wherein the one or more clients comprises a plurality of Remote Terminal Units (RTUs) or a plurality of Programmable Logic Controllers (PLCs) and the plurality of server replicas comprises a plurality of Supervisory Control and Data Acquisition (SCADA) replica servers.

15. The method of claim 13, wherein the fault-tolerant state machine replication system is a Byzantine fault-tolerant state machine replication system.

16. The method of claim 13, wherein each of the plurality of server replicas dynamically agree on an expiration of a plurality of logical timeouts, and
   wherein the agreement on the expiration of the plurality of timeouts includes exchanging a constant number of messages for any number of logical timeouts, within said plurality of timeouts, greater than or equal to one, wherein the size of said messages does not depend upon the number of logical timeouts.

17. The method of claim 13, wherein one or more of said plurality of server replicas sends messages to one of said one or more clients using a first protocol and receives messages from one of said one or more clients using a second protocol that is different from said first protocol.

18. The method of claim 17, wherein said first protocol is a unidirectional logical channel for reliably sending a message from multiple sources to a single destination and for acknowledging, to one or more of the multiple sources, that the message has been successfully received.

19. The method of claim 17, wherein said second protocol is a unidirectional logical channel in which cumulative acknowledgements are used to advance a sliding window to a particular value when said cumulative acknowledgments acknowledging at least up to said particular value are received from a sufficient number of server replicas.

20. A state machine replication system, comprising:
   a plurality of server replicas collecting data pertaining to an industrial process;
   at least one remote client in communication with said plurality of server replicas; and
   an electronic network across which the plurality of replicas and the remote client communicate,
   wherein said plurality of server replicas comprises a state machine replication system that is tolerant of a failure of one or more of said server replicas, and wherein said plurality of replicas is configured to dynamically agree on an expiration of a plurality of logical timeouts, and
   wherein in the state machine replication system, each of the plurality of server replicas receive identical incoming message events and timeouts and process the incoming message events and timeouts in an identical order.

21. The state machine replication system of claim 20, wherein said agreement on the expiration of the plurality of timeouts includes exchanging a constant number of messages for any number of logical timeouts, within said plurality of timeouts, greater than or equal to one, wherein the size of said messages does not depend upon the number of logical timeouts.

22. A state machine replication system, comprising:
   a plurality of server replicas collecting data pertaining to an industrial process;
   at least one remote client in communication with said plurality of server replicas; and
   an electronic network across which the plurality of replicas and the remote client communicate,
   wherein said plurality of server replicas comprises a state machine replication system that is tolerant of a failure of one or more of said server replicas,
   wherein each of said plurality of server replicas is configured to send messages to said remote client using a first protocol and is configured to receive messages said remote client using a second protocol that is different from said first protocol,
   wherein said first protocol is a unidirectional logical channel for sending a message from multiple sources to a single destination and for acknowledging, to each of the multiple sources, that the message has been successfully received, and
   wherein in the state machine replication system, each of the plurality of server replicas receive identical incoming message events and timeouts and process the incoming message events and timeouts in an identical order.

23. The state machine replication system of claim 22, wherein said second protocol is a unidirectional logical channel in which cumulative acknowledgements are used to advance a sliding window to a particular value when said cumulative acknowledgments acknowledging at least up to said particular value are received from a sufficient number of server replicas.

24. The state machine replication system of claim 22, wherein each of said plurality of server replicas is configured to advance a corresponding local window upon receiving a data packet with a sequence number higher than an end of said local window.

25. The state machine replication system of claim 22, wherein each of said plurality of server replicas is configured to detect when one or more of said at least one remote clients is experiencing a Byzantine failure when said server replica receives a data packet with sequence number greater than a last sequence number collectively acknowledged by the plurality of replica servers by a value at least equal to a window size of said server replica.

* * * * *